United States Patent [19]
Ashida

[11] Patent Number: 4,565,980
[45] Date of Patent: Jan. 21, 1986

[54] PSK MODULATOR WITH PRESET AMPLITUDE AND PHASE CORRECTIONS FOR EACH PHASE

[75] Inventor: Hideo Ashida, Yokohama, Japan

[73] Assignee: Fujitsu Limited, Kawasaki, Japan

[21] Appl. No.: 545,460

[22] Filed: Oct. 26, 1983

[30] Foreign Application Priority Data

Oct. 29, 1982 [JP] Japan .............................. 57-190398

[51] Int. Cl.$^4$ .......................... H03C 3/00; H03C 3/04; H03C 3/18; H04B 1/04
[52] U.S. Cl. .................................... 332/16 R; 332/18; 332/23 R; 332/30 V; 455/42; 455/63; 455/110
[58] Field of Search ............... 332/16 R, 17, 18, 23 R, 332/30 V; 455/42, 63, 110, 116

[56] References Cited

U.S. PATENT DOCUMENTS

| | | | |
|---|---|---|---|
| 3,437,957 | 4/1969 | Ames ..................................... | 332/16 |
| 3,437,958 | 4/1969 | Shaw et al. ........................... | 332/16 |
| 4,130,811 | 12/1978 | Katz et al. ............................. | 332/18 |

FOREIGN PATENT DOCUMENTS 1203838 9/1970 United Kingdom .................. 332/18

OTHER PUBLICATIONS

Seki et al., "Modulator and Demodulator Circuits for a Trial 4-Phase PSK Millimeter Wave Repeater", *Review of the Electrical Communication Laboratories*, vol. 23, No. 1-2, pp. 85-99, Jan.-Feb. 1975.

Watanabe et al., "Optimum Modulator Design for High Sensitivity Homodyne System Binary Modulation Method", *IEEE Xactions on Microwave Theory and Techniques*, vol. MTT-23, No. 4, pp. 354-359, Apr. 1975.

Chang et al., "High Data-Rate Solid-State Millimeter-Wave Transmitter Module", *IEEE Xactions on Microwave Theory and Techniques*, vol. MTT-23, No. 6, pp. 470-477, Jun. 1975.

Cuccia, "New PCM Techniques Stress Spectrum and Conservation, Part II", *Microwave Systems News*, vol. 7, No. 2, pp. 37-54, Feb. 1977.

Primary Examiner—Eugene R. LaRoche
Assistant Examiner—D. C. Mis
Attorney, Agent, or Firm—Staas & Halsey

[57] ABSTRACT

A phase modulation method and apparatus for modulating the phase of a carrier wave in accordance with a binary modulating signal to produce a modulated wave. At least one of the amplitude and the phase of the carrier wave or the modulated wave is corrected by predetermined amounts in response to the value of the binary modulating signal, so that the phase position of the modulated waves becomes equal to one of a number of predetermined positions and so that the amplitudes of the modulated waves coincide.

19 Claims, 14 Drawing Figures

PSK MODULATOR WITH PRESET AMPLITUDE AND PHASE CORRECTIONS FOR EACH PHASE

BACKGROUND OF THE INVENTION (1.) Field of the Invention

The present invention relates to a phase modulation method and apparatus used in a digital communication system.

(2.) Description of the Prior Art

Multiple phase shift keying (MPSK) is a well known modulation system in which there are as many phase positions of a carrier wave as there are digital information input code elements. For example, with a quaternary code, there are four different phase positions, i.e., 0°, 90°, 180°, and 270° of the carrier wave. In such a modulation system, it is required that the phase positions of the modulated waves be exactly equal to the desired phase positions and that the amplitude of the modulated waves in the different phase positions be maintained at a constant value.

Since components in a phase modulator have different characteristics, if the phase positions of the modulated waves deviate from the desired phase positions, for example, in the case of a quadrature phase shift keying (QPSK) system, the phase differences of the modulated waves between neighboring phase positions would not be equal to 90°. Furthermore, because of the differences in characteristics of the components, the amplitude of the modulated waves in the different phase positions cannot be equally controlled.

SUMMARY OF THE INVENTION

It is, therefore, an object of the present invention to provide a phase modulation method and apparatus whereby modulated waves can be easily obtained without any error in the phase positions or any deviation of the amplitude.

The above object is achieved by a method for modulating the phase of a carrier wave, in accordance with a binary modulating signal to produce a modulated wave. The method included the steps of producing, in response to the value of the a binary modulating signal, one or two control signals and correcting, in accordance with the produced control signal, at least one of the amplitude and the phase of the carrier wave or the modulated wave. Thus the phase position of the modulated waves becomes equal to one of a number of predetermined positions and the amplitudes of the modulated waves are made to coincide.

The object of the invention is also achieved by a phase modulation apparatus which includes modulator means, for modulating the phase of a carrier wave in accordance with a binary modulating signal, to produce a modulated wave and means for producing, in response to the value of the binary modulating signal, one or two control signals. The device also includes means, coupled to the modulator means and to the producing means, for correcting at least one of the amplitude and the phase of the carrier wave or the modulated wave, in accordance with the control signal from the producing means, whereby the phase position of the modulated waves becomes equal to one of a number of predetermined positions and the amplitudes of the modulated waves are made to coincide.

According to the present invention, error in the phase position of modulated waves and deviation of the amplitude of the modulated waves can be easily suppressed. That is, a phase modulation system with good modulation characteristics can be obtained. Furthermore, a phase modulator having modulation characteristics can be used in this phase modulation system without deteriorating the modulation characteristics of the output from this system.

DESCRIPTION OF THE PREFERRED EMBODIMENTS

Figure 1:
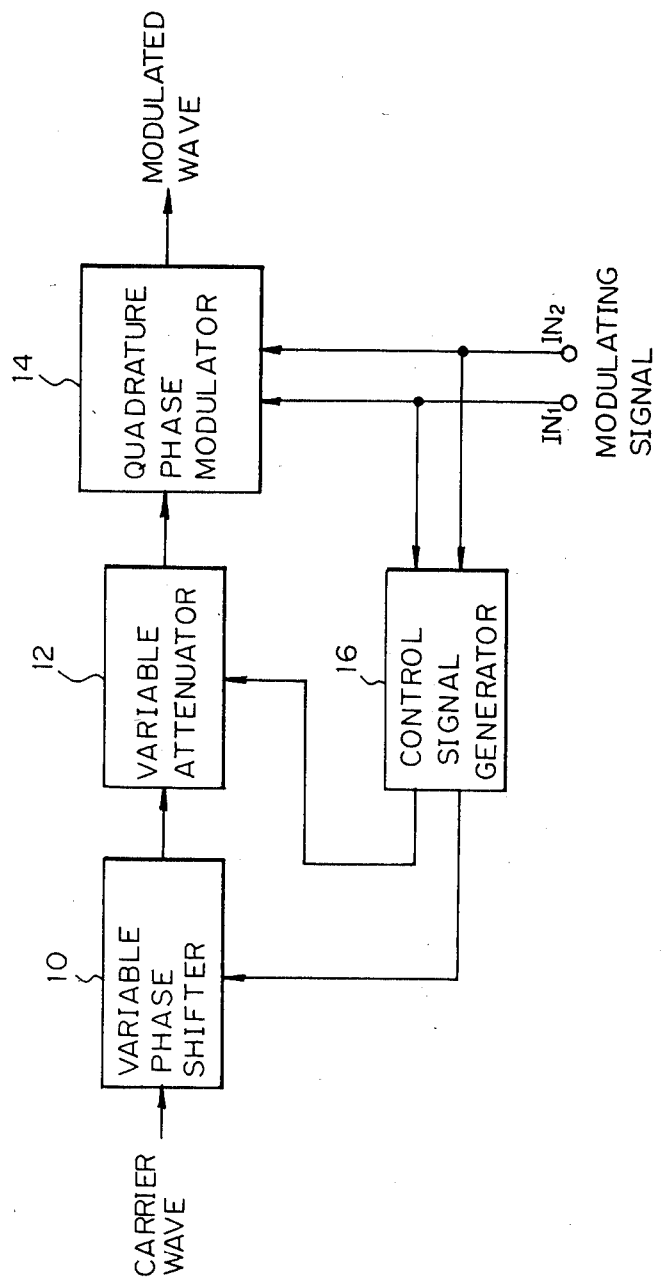
FIG. 1 is a block diagram of a first embodiment according to the present invention.

Referring to FIG. 1 which is a block diagram of a first embodiment of the present invention, reference numeral 10 denotes a variable phase shifter, 12 a variable attenuator, 14 a quadrature phase modulator, and 16 a control signal generator. The variable phase shifter 10 shifts the phase of a carrier wave applied thereto in accordance with the voltage of a first control signal which is applied from the control signal generator 16. The variable attenuator 12 controls the amplitude of the carrier wave from the variable phase shifter 10 in accordance with the voltage of a second control signal which is applied from the control signal generator 16. The quadrature phase modulator 14 modulates the phase of the carrier wave from the variable attenuator 12 in accordance with a modulating signal which is composed of a two-bit binary signal and applied via input terminals $IN_1$ and $IN_2$. Therefore, in this embodiment, a modulated wave has one of four different phase positions, i.e., 0°, 90°, 180°, and 270° depending upon the modulating signal. The control signal generator 16 produces, in response to the modulating signal, the first and second control signals which control the variable phase shifter 10 and the variable attenuator 12, respectively.

Figure 2:
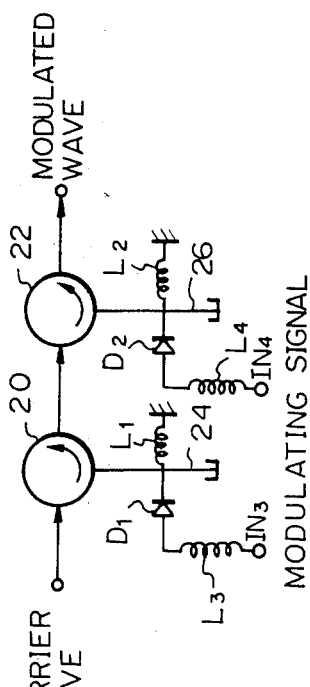
FIGS. 2 and 3 are circuit diagrams of examples of a quadrature phase modulator in FIG. 1.
Figure 3:
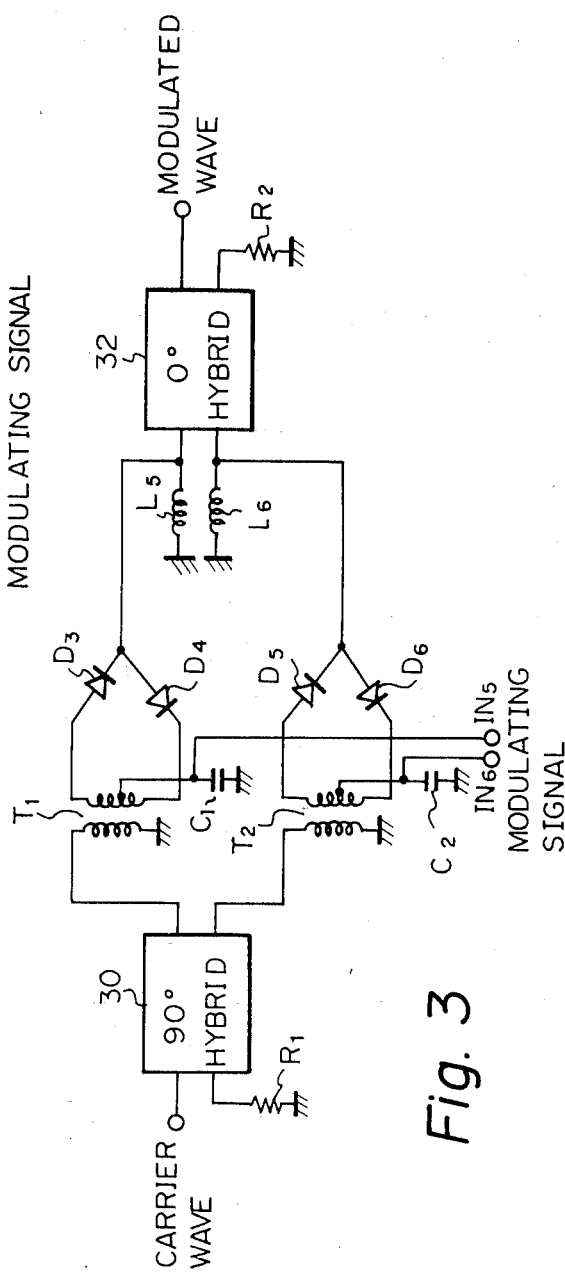

FIGS. 2 and 3 are circuit diagrams of the quadrature phase modulator 14 in FIG. 1.

The quadrature phase modulator shown in FIG. 2 is used in the microwave band and has two circulators 20 and 22. The circulator 20 receives a carrier wave and the circulator 22 outputs a modulated wave. Stubs 24 and 26, each of which has a shorted end, are connected to the circulators 20 and 22, respectively. The stubs 24 and 26 are designed so that the length of the stub 24 is equal to one-fourth of the carrier wavelength ($\lambda/4$) and the length of the stub 26 is equal to one-eighth of carrier wavelength ($\lambda/8$). Diodes $D_1$ and $D_2$, such as PIN-diodes, are provided on the stubs 24 and 26, respectively. The diode $D_1$ and chokes $L_1$ and $L_3$ are connected in series between an input terminal $IN_3$ and ground. The diode $D_2$ and chokes $L_2$ and $L_4$ are connected in series between an input terminal $IN_4$ and ground. When the modulating signal applied to the input terminal $IN_3$ is the high (H) level, the diode $D_1$ turns on, causing the carrier wave from the circulator 20 to return at the diode $D_1$, and the phase of the carrier wave is not shifted. When the modulating signal applied to the input terminal $IN_3$ is low (L) level, the diode $D_1$ turns off and the phase of the carrier wave is shifted by 180°. Similarly to this, when the modulating signal applied to the input terminal $IN_4$ is the H level, the phase of the carrier wave is not shifted, and when $IN_4$ is the L level, the phase is shifted by 90°. Therefore, the phase of the carrier wave changes to four different phase positions of 0°, 90°, 180°, and 270° in response to the modulating signal.

However, since forward impedances of the diodes $D_1$ and $D_2$ are not perfectly zero during the on-state and are not perfectly infinity during the off-state and, furthermore, since a parasitic inductance and capacitance exists, phase positions of the wave modulated by a quadrature phase modulator as shown in FIG. 2 have errors, and the amplitude of the modulated waves in the phase positions are not equal. Therefore, if a phase modulation system is constructed only by the quadrature phase modulator shown in FIG. 2, the aforementioned problems of the prior art occur.

The quadrature phase modulator shown in FIG. 3 is used both in the microwave band and intermediate frequency band. In this modulator, a 90° hybrid 30 receives a carrier wave and produces carrier waves having phase differences of 0° and 90° with respect to the received carrier. The outputs having phases of 0° and 90° from the 90° hybrid 30 are applied to primary windings of transformers $T_1$ and $T_2$, respectively. Diodes $D_3$ and $D_4$ are connected in series to a secondary winding of the transformer $T_1$, and diodes $D_5$ and $D_6$ are connected in series to a secondary winding of the transformer $T_2$. Input terminals $IN_5$ and $IN_6$ are connected to mid-points of the secondary windings of the transformers $T_1$ and $T_2$, respectively. In FIG. 3, furthermore, $R_1$ and $R_2$ denote dummy end resistors, $C_1$ and $C_2$ denote capacitors, and $L_5$ and $L_6$ denote chokes. When the modulating signal applied to the input terminal $IN_5$ is the H or L level, the diode $D_3$ or $D_4$ turns on. Therefore, the carrier wave having the phase of 0°, which is applied to the transformer $T_1$, is shifted by 0° or 180° in response to the modulating signal applied to the input terminal $IN_5$. Also, when the modulating signal applied to the input terminal $IN_6$ is the H or L level, the diode $D_5$ or $D_6$ turns on. Thus, the carrier wave having the phase of 90°, which is applied to the transformer $T_2$, is shifted by 0° or 180° in response to the modulating signal. The above-mentioned shifted carrier waves from the transformers $T_1$ and $T_2$ are applied to a 0° hybrid 32 to output a modulated wave having one of the four different phase positions of 0°, 90°, 180°, and 270° depending upon the modulating signal.

However, since there are differences between outputs from the 90° hybrid 30 and 0° hybrid 32, differences between the forward voltage drops of the diodes $D_3$ to $D_6$, and asymmetry of the transformers $T_1$ and $T_2$, the phase positions of the waves modulated by the quadrature phase modulator shown in FIG. 3 also have errors, and, furthermore, the amplitudes of the modulated waves in the phase positions are not equal to each other. That is, if a phase modulation system is constructed only by the quadrature phase modulator shown in FIG. 3, the correct modulation characteristics cannot be obtained as well as a system using only the quadrature phase modulator shown in FIG. 2.

Figure 4:
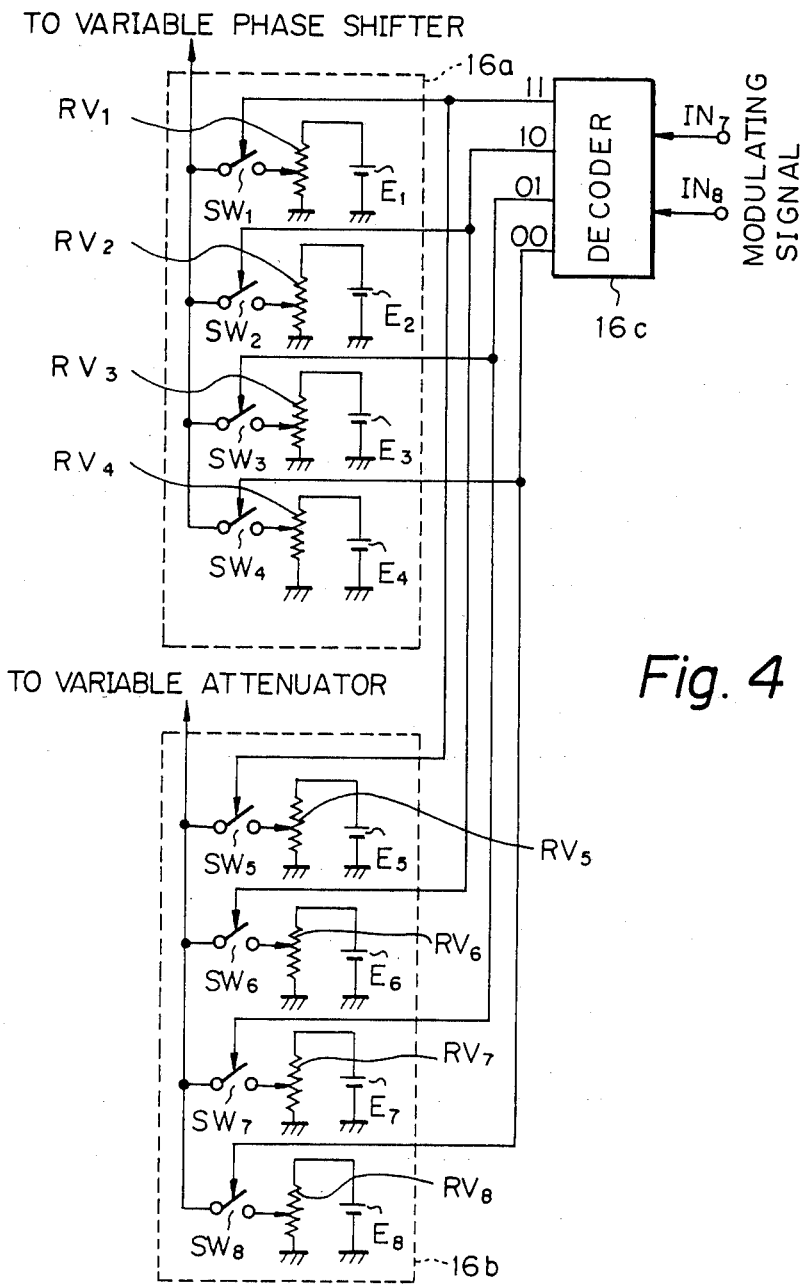
FIG. 4 is a circuit diagram of an example of a control signal generator in FIG. 1.

FIG. 4 is a circuit diagram of the control signal generator 16 in FIG. 1. In FIG. 4, reference numerals 16a and 16b denote voltage adjusting circuits which produce control signals for the variable phase shifter 10 and for the variable attenuator 12, respectively, and 16c denotes a decoder. The voltage adjusting circuit 16a has four potentiometers $RV_1$, $RV_2$, $RV_3$ and $RV_4$ and four electronic switches $SW_1$, $SW_2$, $SW_3$, and $SW_4$ connected to sliding contacts of the respective potentiometers $RV_1$, $RV_2$, $RV_3$, and $RV_4$. To each of the potentiometers $RV_1$, $RV_2$, $RV_3$, and $RV_4$, a constant d.c. voltage is supplied from respective voltage sources $E_1$, $E_2$, $E_3$, and $E_4$. Each of the electronic switches $SW_1$, $SW_2$, $SW_3$, and $SW_4$ is controlled by one of the outputs from the decoder 16c. The other voltage adjusting circuit 16b has the same constitution as the above voltage adjusting circuit 16a. The decoder 16c receives the two-bit modulating signal via input terminals $IN_7$ and $IN_8$ and decodes it to produce one of four outputs. If the modulating signal is "11", the H level output appears only at the output terminal indicated by "11" to close the electronic switch $SW_1$ and also an electronic switch $SW_5$. Thus, in this case, a voltage produced by the potentiometer $RV_1$ is applied to the variable phase shifter 10 as a control signal. Also, a voltage produced by a potentiometer $RV_5$ is applied to the variable attenuator 12 as a control signal. Namely, in accordance with the modulating signal, one of the potentiometers $RV_1$, $RV_2$, $RV_3$, and $RV_4$ is selected, and a voltage produced by the selected potentiometer is fed to the variable phase shifter 10. Similarly, one of potentiometers $RV_5$, $RV_6$, $RV_7$, and $RV_8$ is selected in accordance with the modulating signal, and a voltage produced by the selected potentiometer is fed to the variable attenuator 12. Each of the potentiometers $RV_1$ to $RV_8$ is preliminarily adjusted to produce a voltage which can control the variable phase shifter 10 or the variable attenuator 12 to appropriately correct the phase or the amplitude of the carrier wave. The detailed procedure for adjusting the potentiometer will be described later.

Figure 5:
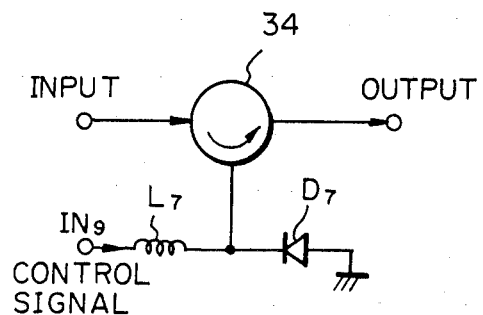
FIGS. 5 and 6 are circuit diagrams of examples of a variable phase shifter in FIG. 1.
Figure 6:
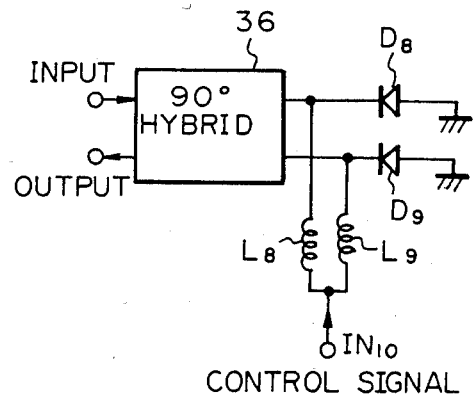

FIGS. 5 and 6 are circuit diagrams of the variable phase shifter 10 in FIG. 1.

In the phase shifter shown in FIG. 5, a varactor diode $D_7$ is provided between an intermediate port of a circulator 34 and ground. The capacitance of the varactor diode $D_7$ varies with the d.c. voltage applied thereto from the control signal generator 16 (FIG. 1) via an input terminal $IN_9$ and a choke $L_7$. Thus, the phase of the reflected carrier wave is shifted in accordance with the d.c. voltage (control signal) from the control signal generator 16.

In the phase shifter shown in FIG. 6, two varactor diodes $D_8$ and $D_9$ are provided between terminals of a 90° hybrid 36 and ground. The capacitance of the varactor diodes $D_8$ and $D_9$ vary with the d.c. voltage applied from the control signal generator 16 (FIG. 1) via an input terminal $IN_{10}$ and chokes $L_8$ and $L_9$, respectively. Thus, the phase of the reflected carrier wave is shifted in accordance with the d.c. voltage (control signal) from the control signal generator 16.

Figure 7:
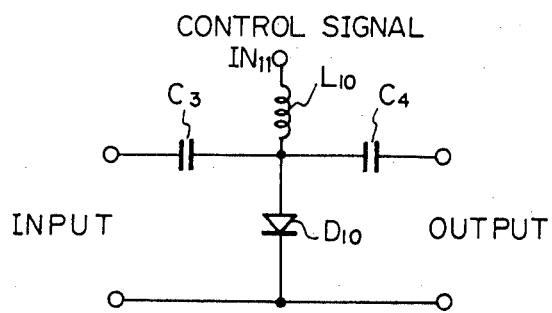
FIG. 7 is a circuit diagram of an example of a variable attenuator in FIG. 1.

FIG. 7 is a circuit diagram of the variable attenuator 12 shown in FIG. 1. A diode $D_{10}$ such as a PIN-diode is provided in a transmission line. The impedance of the diode $D_{10}$ varies with the d.c. current (control signal) fed from the control signal generator 16 (FIG. 1) via an input terminal $IN_{11}$ and a choke $L_{10}$. In FIG. 7, $C_3$ and $C_4$ denote capacitors for cutting the d.c. current off.

The operation of the above-mentioned embodiment will now be described.

Before operating the phase modulation system, it is necessary to adjust the control signals. This adjustment is performed by adjusting the potentiometers $VR_1$ to $VR_8$ in the control signal generator 16 while maintaining the modulating signals at their respective values. For example, the potentiometers $RV_1$ and $RV_5$ are adjusted while the modulating signal is maintained at "11" so that the phase position of the modulated wave from the quadrature phase modulator 14 becomes equal to a desired position, for instance, a position of 0°, and the amplitude of the modulated wave becomes equal to a desired value. The potentiometers $RV_2$ and $RV_6$ are similarly adjusted while the modulating signal is maintained at "10". The remaining potentiometers $RV_3$ and $RV_7$ and also $RV_4$ and $RV_8$ are adjusted in a like manner.

As a result of the above-adjustment, during operation, the variable phase shifter 10 compensates for the errors in the phase positions induced by the quadrature phase modulator 14, and the variable attenuator 12 compensates for deviation of the amplitude induced by the quadrature phase modulator 14. Therefore, the phase of the modulated wave output from the phase modulation system of FIG. 1 is exactly controlled to the desired phase positions, i.e., 0°, 90°, 180°, and 270°, and the amplitude of the modulated wave is also exactly controlled to a constant value.

Figure 8A:
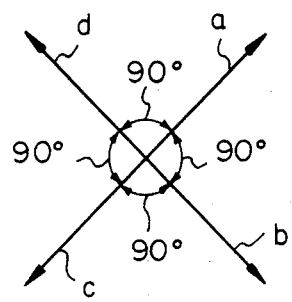
FIGS. 8a and 8b diagrams for explaining error in the phase position and deviation of the amplitude of modulated waves.
Figure 8B:
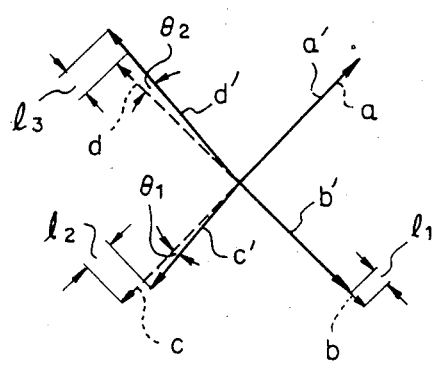

FIG. 8a indicates desired modulated waves a, b, c and d having a phase interval of 90° and an amplitude of a constant value. On the other hand, FIG. 8b indicates an example of actual modulated waves modulated by the quadrature phase modulator without correcting the phase and the amplitude. In FIG. 8b, solid lines a', b', c', and d' denote the actual modulated waves and broken lines a, b, c, and d denote the desired modulated waves. The actual modulated wave b' has a deviation $l_1$ of the amplitude with respect to the desired modulation wave b. The actual modulated wave c' has a deviation $l_2$ of the amplitude and an error $\theta_1$ of the phase with respect to the desired modulated wave c. The actual modulated wave d' has a deviation $l_3$ of the amplitude and an error $\theta_2$ of the phase with respect to the desired modulated wave d. The control signals from the control signal generator 16, that is, the potentiometers $RV_5$ to $RV_8$, are preliminarily adjusted depending upon the deviations $l_1$, $l_2$, and $l_3$ of the amplitude. Thus, these deviations, $l_1$, $l_2$, and $l_3$ at each phase position are compensated for by the variable attenuator 12. In a like manner, the errors $\theta_1$ and $\theta_2$ of the phase are compensated for by the variable phase shifter 10.

FIGS. 9 to 13 are block diagrams of other embodiments of the present invention.

Figure 9:
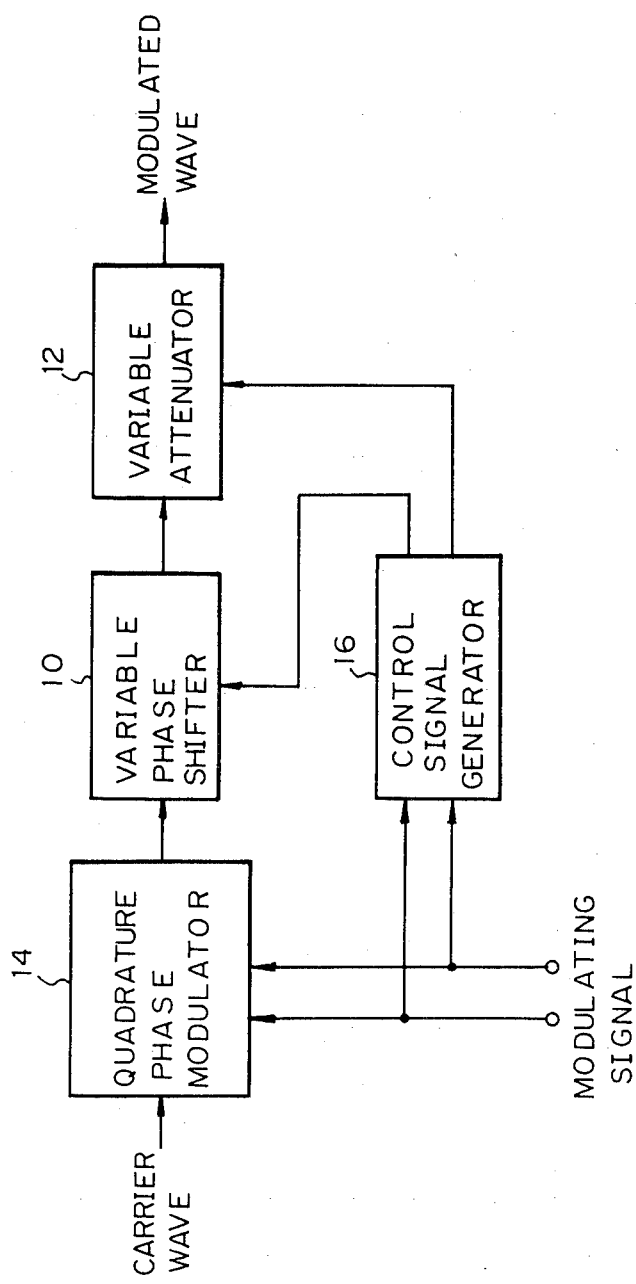
FIGS. 9 to 13 are block diagrams of second to sixth embodiments according to the present invention.

A second embodiment is shown in FIG. 9, wherein the variable phase shifter 10 and the variable attenuator 12 are connected to the output of the quadrature phase modulator 14, so as to correct the phase and the amplitude of the modulated wave from the modulator 14. Otherwise, this embodiment is the same as that of the first embodiment.

Figure 10:
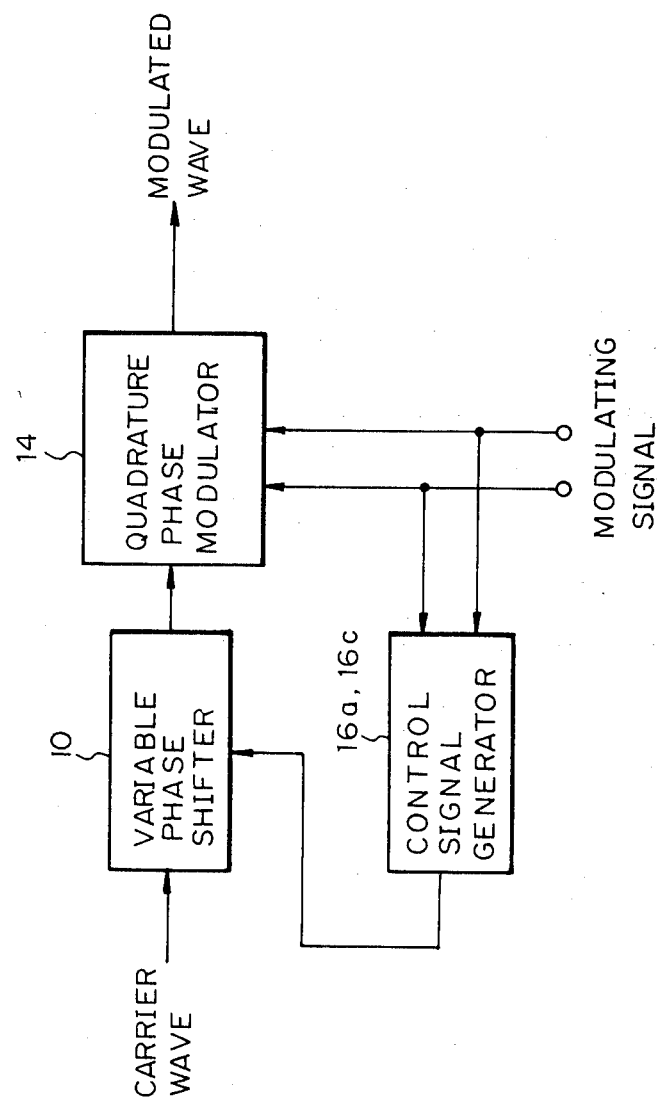

A third embodiment is shown in FIG. 10. In this embodiment, the variable attenuator 12 in the first embodiment of FIG. 1 is omitted. This embodiment is effective if the quadrature phase modulator 14 can produce modulated waves having the same amplitude at each phase position.

Figure 11:
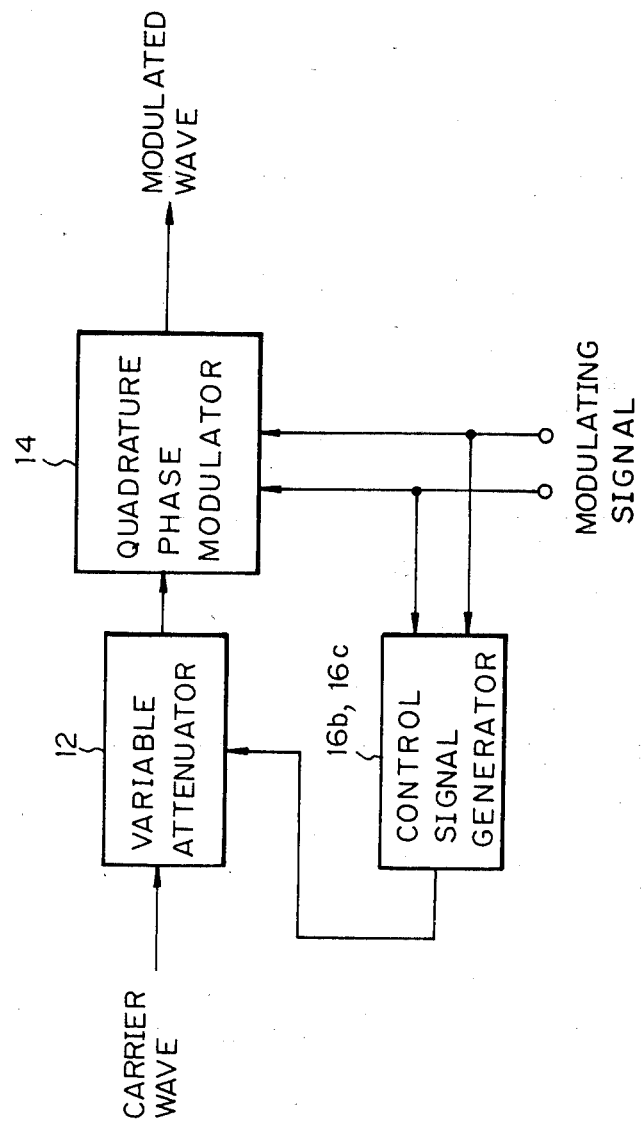

A fourth embodiment is shown in FIG. 11. In this embodiment, the variable phase shifter 10 in the first embodiment of FIG. 1 is omitted. The embodiment is used when the quadrature phase modulator 14 produces modulated waves with the phase positions exactly equal to the desired phase positions.

Figure 12:
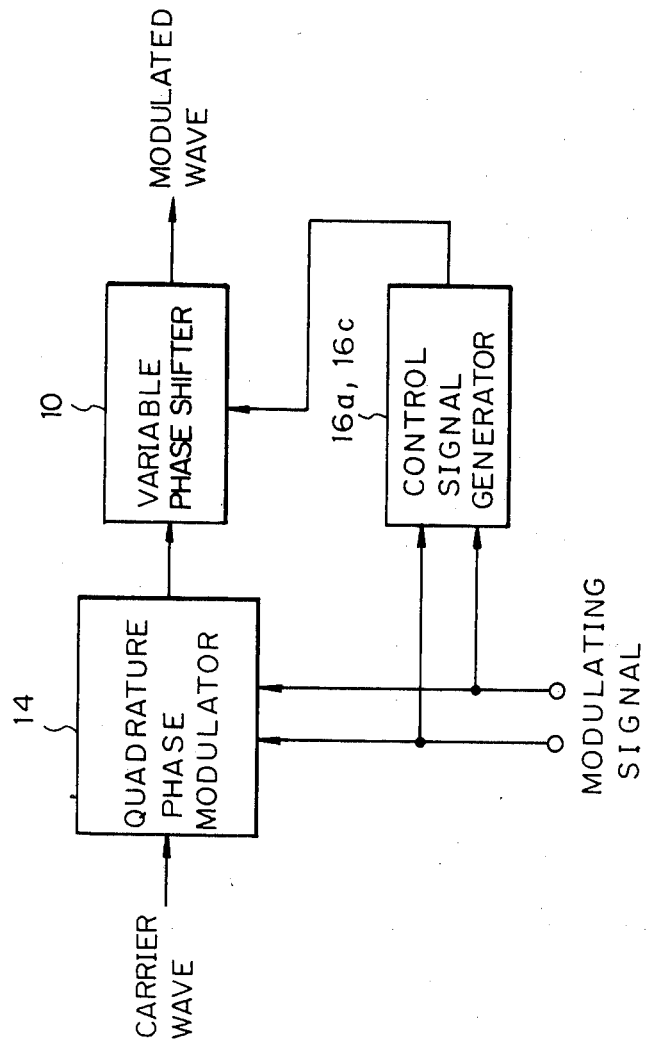
Figure 13:
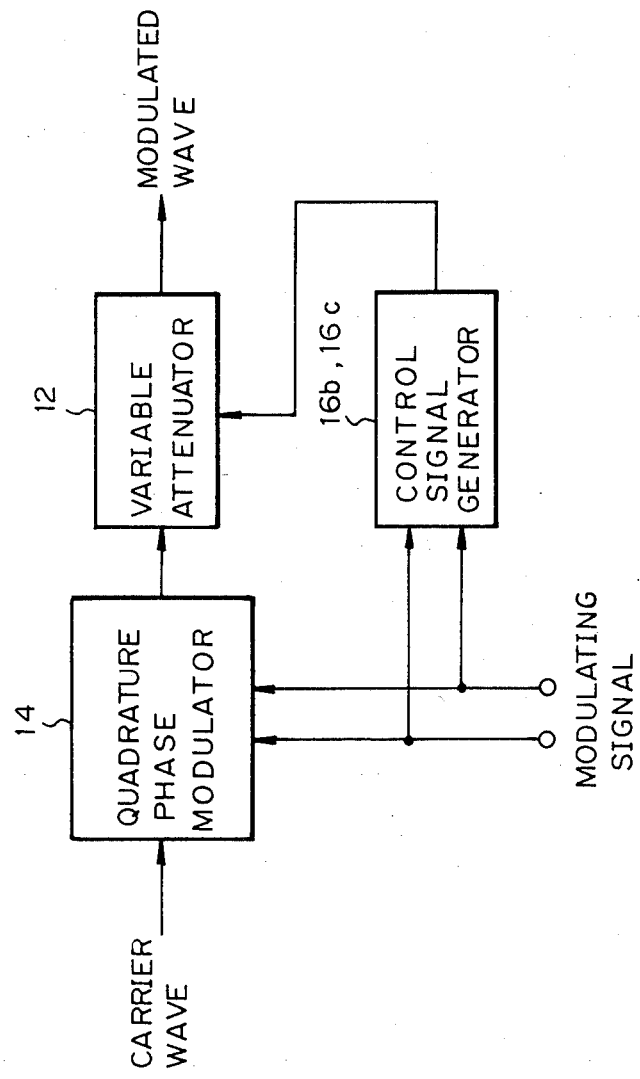

In the fifth and sixth embodiments shown in FIGS. 12 and 13, the variable phase shifter 10 or the variable attenuator 12 is connected to the output of the quadrature phase modulator 14 so as to correct the phase or the amplitude of the modulated wave from the modulator 14.

In the above-mentioned embodiments, the phase modulators are formed by quadrature phase modulators so as to produce a modulated wave having four different phase positions. However, according to the present invention, the phase modulators may be formed by other multiple phase modulators so as to produce a modulated wave having, e.g., eight, 16, or 32 different phase positions.

According to the present invention, furthermore, the variable phase shifter may be formed by a current controlled variable phase shifter, and the variable attenuator may be formed by a voltage controlled variable attenuator. The control signals, of course, may be composed of voltage signals or current signals.

Many widely different embodiments of the present invention may be constructed without departing from the spirit and scope of the present invention. It should be understood that the present invention is not limited to the specific embodiments described in this specification, except as defined in the appended claims.

I claim:

1. A phase modulation method for modulating the phase of a carrier wave in accordance with a binary modulating signal to produce a modulated wave, comprising the step of independently correcting at least one of the amplitude and the phase of one of the carrier wave or the modulated wave by respective, predetermined amplitude and phase increments in accordance with the respective values of the binary modulating signal.

2. A phase modulation method for modulating the phase of a carrier wave in accordance with a binary modulating signal to produce a modulated wave, said method comprising the steps of:
   (a) producing, in response to the value of the binary modulating signal, at least one control signal; and
   (b) independently correcting, in accordance with the at least one control signal, at least one of the amplitude and the phase of one of the carrier wave or the modulated wave, whereby the phase position of the modulated wave becomes substantially equal to one of a number of predetermined phase positions and the amplitude of the modulated wave approaches a predetermined amplitude.

3. A method as claimed in claim 2, wherein said producing step (a) includes a sub-step of selecting, in response to the value of the binary modulating signal, at least one control signal having a preliminarily adjusted value.

4. A method as claimed in claim 2, wherein said correcting step (b) includes a sub-step of correcting, in accordance with the at least one control signal, both the amplitude and the phase of the carrier wave.

5. A method as claimed in claim 2, wherein said correcting step (b) includes a sub-step of correcting, in accordance with the at least one control signal, both amplitude and the phase of the modulated wave.

6. A method as claimed in claim 2, wherein said correcting step (b) includes a sub-step of correcting, in accordance with the at least one control signal, the amplitude of the carrier wave or the modulated wave.

7. A method as claimed in claim 2, wherein said correcting step (b) includes a sub-step of correcting, in accordance with the at least one control signal, the phase of the carrier wave or the modulated wave.

8. A phase modulation apparatus operatively connectable to receive a carrier wave and a binary modulating signal, comprising:

means, operatively connected to receive the carrier wave and the binary modulating signal, for modulating the phase of the carrier wave in accordance with the binary modulating signal to produce a modulated wave;

means, operatively connected to receive the binary modulating signal, for producing, in response to the binary modulating signal, at least one control signal; and means, operatively connected to said modulating means and said producing means, for independently correcting at least one of the amplitude and the phase of one of the carrier wave or the modulated wave, in accordance with the at least one control signal from said producing means, whereby the phase position of the modulated wave becomes substantially equal to one of a number of predetermined phase positions and the amplitude of the modulated wave approaches a predetermined amplitude.

9. An apparatus as claimed in claim 8, wherein said producing means includes means for selecting, in response to the value of the binary modulating signal said at least one control signal, the value of each of the at least one control signal being preliminarily adjusted.

10. An apparatus as claimed in claim 8, wherein said correcting means includes means, operatively connected to the input of said modulating means, for correcting, in accordance with the at least one control signal, both the amplitude and the phase of the carrier wave.

11. An apparatus as claimed in claim 10, wherein said at least one control signal includes first and second control signals and wherein said correcting means comprises:

a variable phase shifter, operatively connected to receive the carrier wave, for shifting, in accordance with the first control signal, the phase of the carrier wave; and a variable attenuator, operatively connected to said variable phase shifter, for reducing, in accordance with the second control signal, the amplitude of the phase shifted carrier wave.

12. An apparatus as claimed in claim 8, wherein said correcting means includes means, operatively connected to the output of said modulator means, for correcting, in accordance with the at least one control signal, both the amplitude and the phase of the modulated wave.

13. An apparatus as claimed in claim 12, wherein the at least one control signal includes first and second signals, and wherein said correcting means comprises:

a variable phase shifter, operatively connected to said producing means, for shifting, in accordance with the first contol signal, the phase of the modulated wave; and a variable attenuator, operatively connected to said variable phase shifter, for reducing, in accordance with a second control signal, the amplitude of the modulated wave.

14. An apparatus as claimed in claim 8, wherein said correcting means includes means, operatively connected to one of the input or the output of said modulator means, for correcting, in accordance with the at least one control signal, the phase of the carrier wave or the modulated wave.

15. An apparatus as claimed in claim 8, wherein said correcting means includes means, operatively connected to one of the input or the output of said modulator means, for correcting, in accordance with the at least one control signal, the amplitude of the carrier wave or the modulated wave.

16. An apparatus as claimed in claim 10, wherein said correcting means comprises a variable phase shifter, operatively connected to said control means and operatively connected to receive the carrier wave, for shifting, in accordance with the at least one control signal, the phase of the carrier wave.

17. An apparatus as claimed in claim 10, wherein said correcting means comprises a variable attenuator, operatively connected to said control means and operatively connected to receive the carrier wave, for reducing, in accordance with the at least one control signal, the amplitude of the carrier wave.

18. An apparatus as claimed in claim 12, wherein said correcting means comprises a variable phase shifter, operatively connected to said modulating means and said control means, for shifting, in accordance with the at least one control signal, the phase of the modulated wave.

19. An apparatus as claimed in claim 12, wherein said correcting means comprises a variable attenuator, operatively connected to said modulating means and said control means, for reducing, in accordance with the at least one control signal, the amplitude of the modulated wave.

* * * * *

UNITED STATES PATENT AND TRADEMARK OFFICE
CERTIFICATE OF CORRECTION

PATENT NO. : 4,565,980
DATED : JANUARY 21, 1986
INVENTOR(S) : HIDEO ASHIDA

It is certified that error appears in the above-identified patent and that said Letters Patent is hereby corrected as shown below:

Col. 5, line 38, "$l_1$" should be -- $\ell_1$ --;

line 40, "$l_2$" should be -- $\ell_2$ --;

line 43, "$l_3$" should be -- $\ell_3$ --;

line 49, "$l_1$, $l_2$, and $l_3$" should be -- $\ell_1$, $\ell_2$, and $\ell_3$ --;

line 50, "$l_1$, $l_2$, and $l_3$" should be -- $\ell_1$, $\ell_2$, and $\ell_3$ --.

Col. 7, line 52, "shifiting" should be --shifting--.

Signed and Sealed this

Eighth Day of April 1986

[SEAL]

Attest:

DONALD J. QUIGG

Attesting Officer

Commissioner of Patents and Trademarks